(12) United States Patent
Wang et al.

(10) Patent No.: US 11,055,330 B2
(45) Date of Patent: Jul. 6, 2021

(54) UTILIZING EXTERNAL KNOWLEDGE AND MEMORY NETWORKS IN A QUESTION-ANSWERING SYSTEM

(71) Applicant: INTERNATIONAL BUSINESS MACHINES CORPORATION, Armonk, NY (US)

(72) Inventors: Peng Wang, Beijing (CN); Shi Lei Zhang, Beijing (CN); Wen Liu, Beijing (CN); Feng Jin, Beijing (CN); Qin Shi, Beijing (CN); Yong Qin, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 255 days.

(21) Appl. No.: 16/199,923

(22) Filed: Nov. 26, 2018

(65) Prior Publication Data

US 2020/0167428 A1    May 28, 2020

(51) Int. Cl.
| | |
|---|---|
| *G06F 16/00* | (2019.01) |
| *G06F 16/332* | (2019.01) |
| *G06N 3/04* | (2006.01) |
| *G06F 16/951* | (2019.01) |
| *G06F 16/33* | (2019.01) |
| *G06F 16/9038* | (2019.01) |

(52) U.S. Cl.
CPC ...... *G06F 16/3329* (2019.01); *G06F 16/3334* (2019.01); *G06F 16/9038* (2019.01); *G06F 16/951* (2019.01); *G06N 3/04* (2013.01)

(58) Field of Classification Search
CPC ............. G06F 16/3329; G06F 16/951; G06F 16/3334; G06N 5/022; G06N 3/0454
See application file for complete search history.

(56) References Cited

U.S. PATENT DOCUMENTS

| | | | |
|---|---|---|---|
| 9,318,108 B2* | 4/2016 | Gruber | G06N 5/022 |
| 9,613,093 B2* | 4/2017 | Clark | G06F 16/24535 |

(Continued)

OTHER PUBLICATIONS

Nugaliyadde, "Reinforced Network for Question Answering", 24th International Conference on Neural Information Processing, Nov. 2017, pp. 482-490.

(Continued)

*Primary Examiner* — Leslie Wong
(74) *Attorney, Agent, or Firm* — Tutunjian & Bitetto, P.C.; Joseph Petrokaitis (57) ABSTRACT

A computer-implemented method for utilizing external knowledge and memory networks in a question-answering system includes receiving, from a search engine of a question-answering system, one or more search results based on a search query associated with a question submitted via a user interface associated with a computing device, analyzing the one or more search results to generate search evidence as a source of external knowledge for generating an answer to the question, the search evidence including one or more titles and one or more corresponding text snippets, encoding the search evidence and the search query to generate vectors stored in a memory network, obtaining a final vector representation based on the encoding, and decoding the final vector representation to obtain the answer to the question.

15 Claims, 6 Drawing Sheets

(56) References Cited

U.S. PATENT DOCUMENTS

| | | | |
|---|---|---|---|
| 10,276,170 B2* | 4/2019 | Gruber | G06F 3/167 |
| 10,366,158 B2* | 7/2019 | Bellegarda | G06N 5/022 |
| 10,380,236 B1* | 8/2019 | Ganu | G06F 40/126 |
| 10,607,141 B2* | 3/2020 | Jerram | G10L 13/00 |
| 10,733,380 B2* | 8/2020 | Leidner | G06F 17/18 |
| 2009/0070322 A1* | 3/2009 | Salvetti | G06F 16/3334 |
| 2014/0006012 A1* | 1/2014 | Zhou | G06F 16/3344 |
| | | | 704/9 |
| 2014/0358890 A1* | 12/2014 | Chen | G06F 16/3329 |
| | | | 707/710 |
| 2017/0024645 A1 | 1/2017 | Socher et al. | |
| 2017/0076196 A1* | 3/2017 | Sainath | G06N 3/084 |
| 2017/0103324 A1 | 4/2017 | Weston et al. | |
| 2017/0243107 A1* | 8/2017 | Jolley | G06N 5/02 |
| 2017/0323204 A1* | 11/2017 | Akbulut | G06F 16/334 |
| 2018/0046705 A1 | 2/2018 | Murdock, IV et al. | |
| 2018/0113867 A1* | 4/2018 | Erpenbach | G06F 16/243 |
| 2018/0114108 A1 | 4/2018 | Lao et al. | |
| 2018/0150743 A1* | 5/2018 | Ma | G06N 3/084 |
| 2018/0336183 A1* | 11/2018 | Lee | G06F 40/30 |
| 2018/0357240 A1* | 12/2018 | Miller | G06F 16/24566 |
| 2018/0365321 A1* | 12/2018 | Ke | G06N 3/0445 |
| 2019/0108282 A1* | 4/2019 | Zeng | G06F 16/248 |
| 2020/0089765 A1* | 3/2020 | Jayaraman | G06F 16/3347 |
| 2020/0117742 A1* | 4/2020 | Huang | G06F 16/9535 |
| 2020/0134422 A1* | 4/2020 | Gliozzo | G06N 3/0481 |

OTHER PUBLICATIONS

Kumar, "Ask Me Anything: Dynamic Memory Networks for Natural Language Processing", arXiv:1506.07285, Mar. 2016, 10 pages.

Nie, "Attention-Based Encoder-Decoder Model for Answer Selection in Question Answering", Frontiers of Information Technology & Electronic Engineering, Apr. 2017, vol. 18, Issue 4, pp. 535-544.

Kenter, "Attentive Memory Networks: Efficient Machine Reading for Conversational Search", CAIR, Aug. 2017, 7 pages.

Sukhbaatar, "End-to-End Memory Networks", arXiv:1503.08895, Nov. 2015, 11 pages.

Weston, "Memory Networks", ICLR, Nov. 2015, 15 pages.

* cited by examiner

UTILIZING EXTERNAL KNOWLEDGE AND MEMORY NETWORKS IN A QUESTION-ANSWERING SYSTEM

BACKGROUND

Technical Field

The present invention generally relates to machine learning, and more particularly to utilizing external knowledge and memory networks in a question-answering system.

Description of the Related Art

Question-answering software can provide question-answering services to users over, e.g., the Internet, to find answers to questions. Question-answering software can be offered as a service (e.g., software as a service (SaaS)) or in an open source format. Question-answering websites can include question-answering databases that allow users to submit electronic questions for answering, or answers to those questions posted on the question-answering website.

SUMMARY

In accordance with an embodiment of the present invention, a system for utilizing external knowledge and memory networks in a question-answering system is provided. The system includes a memory device for storing program code and at least one processor operatively coupled to the memory device. The at least one processor is configured to execute program code stored on the memory device to receive, from a search engine of a question-answering system, one or more search results based on a search query associated with a question submitted via a user interface associated with a computing device, and analyze the one or more search results to generate search evidence as a source of external knowledge for generating an answer to the question. The search evidence includes one or more titles and one or more corresponding text snippets. The at least one processor is further configured to execute program code stored on the memory device to encode the search evidence and the search query to generate vectors stored in a memory network, obtain a final vector representation based on the encoding, and decode the final vector representation to obtain the answer to the question.

In accordance with another embodiment of the present invention, a computer-implemented method for utilizing external knowledge and memory networks in a question-answering system is provided. The method includes receiving, from a search engine of a question-answering system, one or more search results based on a search query associated with a question submitted via a user interface associated with a computing device, analyzing the one or more search results to generate search evidence as a source of external knowledge for generating an answer to the question, the search evidence including one or more titles and one or more corresponding text snippets, encoding the search evidence and the search query to generate vectors stored in a memory network, obtaining a final vector representation based on the encoding, and decoding the final vector representation to obtain the answer to the question.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The embodiments described herein provide for systems and methods for utilizing external knowledge and memory networks for answer generation in a question-answering (QA) system. The embodiments described here can provide improvements in QA system technology. For example, the embodiments described herein can improve the ability of searching technology to build QA database search engines by, e.g., increasing expansion capability. As another example, the embodiments described herein can improve the expression of proper information in the question to improve answer generation based on a search query associated with a question.

In present aspects, the embodiments described herein can use a memory-network-based QA system that leverages search evidence obtained from search engine results (e.g., web pages) to generate an answer within an encoder-decoder framework. A memory network (e.g., a memory neural network) is a model that is trained to operate with a memory component. For example, an input can be converted into a feature representation (e.g., encoding the input into a feature vector), memories stored in the memory component can be updated based on the feature representation of the input (e.g., storing the feature representation in a memory slot), output features can be generated in the feature representation space based on the feature representation and the updated memories of the memory component (e.g., reading the memory to determine which of the memories are relevant memories for a response), and the output features can be decoded to obtain a response in a format (e.g., text or action).

As an illustrative example, a set of output features can be generated by finding k supporting memories based on a textual input. More specifically, a first output feature can be determined as a first input/memory slot pair that results in a maximum matching score, a second output feature can be determined as a second input/memory slot pair that results in a maximum matching score, given the first input/memory slot pair, etc. The set of output features can be represented as a concatenation of the input and the memory slots of each pair. A textual response can be generated as a word of a set of words in a dictionary that corresponds to a highest matching score based on the set of output features, or can be generated as a sentence by employing a neural network (e.g., employing a recurrent neural network (RNN) conditioned on the output features).

In some embodiments, an end-to-end memory network model can be used to represent questions by dynamically incorporating search evidence via a memory mechanism. An end-to-end memory network model is a memory network model that is trained end-to-end, which can reduce an amount of supervision during training and thus can improve the ability of the memory network model to generate answers in accordance with the embodiments described herein. For example, the end-to-end memory network can include an RNN architecture where the recurrence reads from a large external memory. More specifically, the end-to-end memory network model can be broken up into an input memory representation stage, an output memory representation stage, and a final prediction generation stage. A description of the stages of the end-to-end memory network model will now be provided in the context of a single layer model that handles a single memory hop operation. However, a multiple layer model including a memory layer stack can be realized to handle a plurality of memory hop operations. Memory network model can be trained using any suitable technique (e.g., stochastic gradient descent).

In the input memory representation stage, a set of inputs $\{x_i\}$ can be converted into a set of memory vectors $\{m_i\}$ having a dimension d by embedding each input in a continuous space (e.g., using an embedding matrix having size d×V, where V is a size of a dictionary of words), and a query can be embedded (e.g., using another embedding matrix having size d×V) to obtain an internal state u. In the embedding space, a match between the internal state and each memory vector $m_i$ can be determined by computing the inner product $u^T m_i$, and determining a probability $p_i$ based on the inner product. For example, $p_i=\text{SoftMax}(u^T m_i)$.

In the output memory representation stage, each input $x_i$ can be transformed into a corresponding output vector $c_i$ (e.g., using yet another embedding matrix), and a response vector o can be obtained as follows: $o=\Sigma_i p_i c_i$.

In the final prediction generation stage, a predicted label a' can be generated based on the sum of o and u. For example, $a'=\text{SoftMax}(W(o+u))$, where W is a weight matrix. The matrices used in the model can be learned using any suitable technique (e.g., cross-entropy loss minimization between a' and the true label a).

Illustratively, a question can be received as input as a query into a search engine of a QA system via a user interface, and one or more search results (e.g., one or more web pages) are returned based on the query. The one or more search results can be analyzed to generate search evidence corresponding to external knowledge. For example, the search evidence for a given search result can include a title of the search result and a text snippet corresponding to a description of the search result. The search evidence can be stored in one or more memory cells of a neural network. The query and the search evidence can be encoded into a question representation including a fixed-length vector via an encoder layer of the neural network. An answer to the question can be generated by decoding the question representation via a decoder layer of the neural network.

Figure 1:
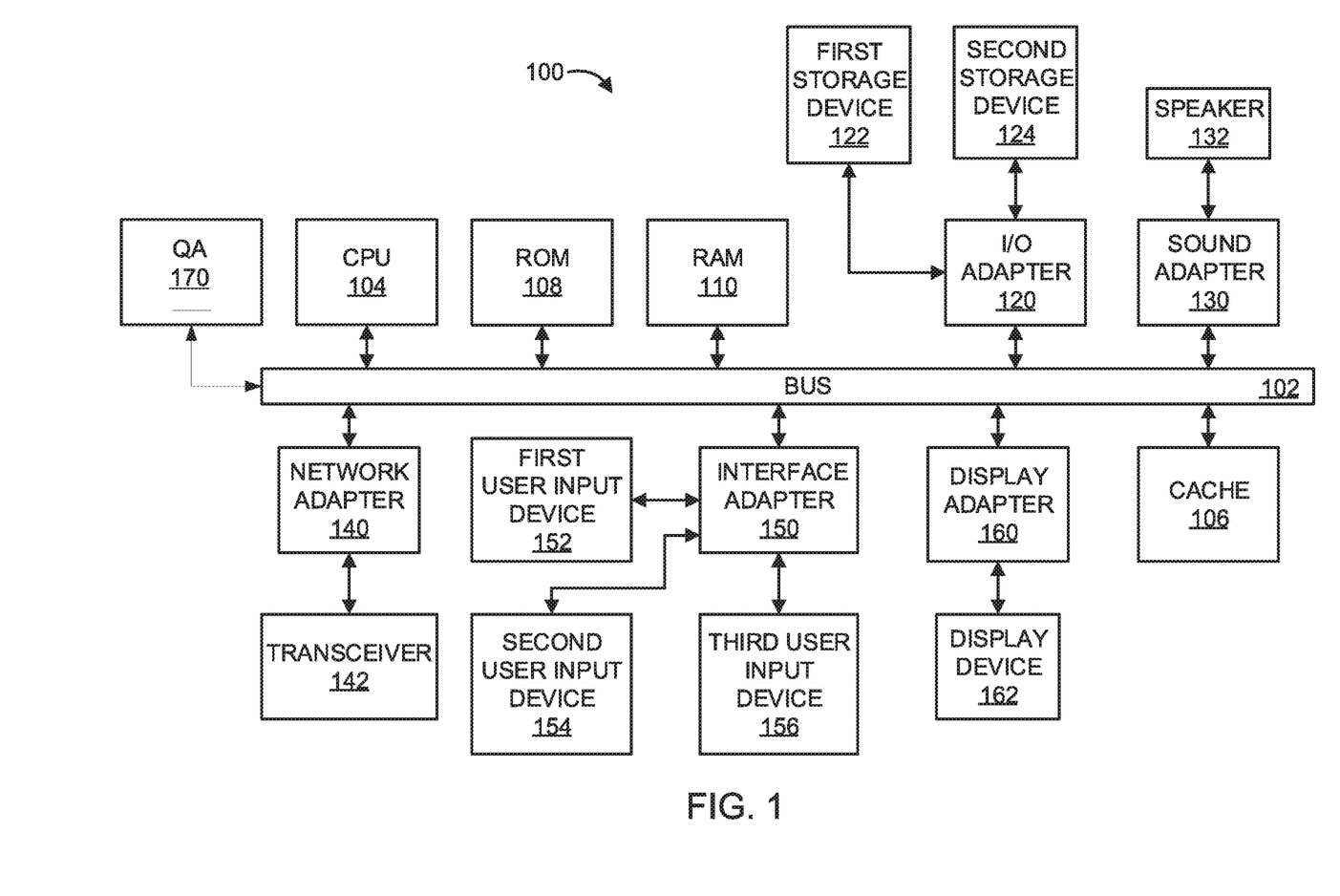
FIG. 1 is a block diagram of a processing system, in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100. For example, one or more of the user input devices 152, 154, and 156 can input and output information to and from system 100 for using a question-answering (QA) interface of a QA system utilizing external knowledge and memory networks.

QA component 170 may be operatively coupled to system bus 102. QA component 170 is configured to perform one or more of the operations described below with respect to utilizing external knowledge and memory networks in a QA system. QA component 170 can be implemented as a stand-alone special purpose hardware device, or may be implemented as software stored on a storage device. In the embodiment in which QA component 170 is software-implemented, although the anomaly detector is shown as a separate component of the computer system 100, QA component 170 can be stored on, e.g., the first storage device 122 and/or the second storage device 124. Alternatively, QA component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
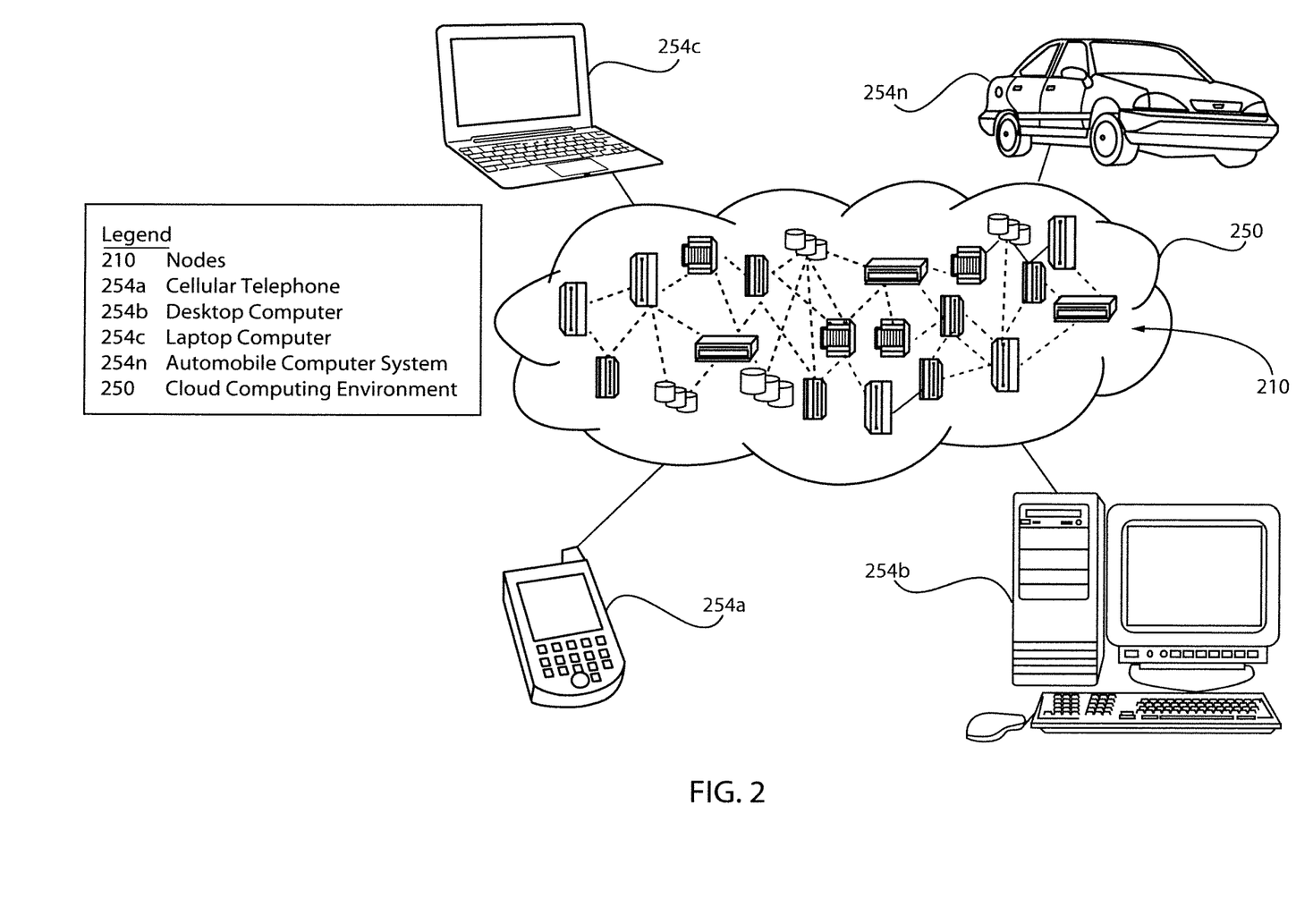
FIG. 2 is a block diagram showing an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
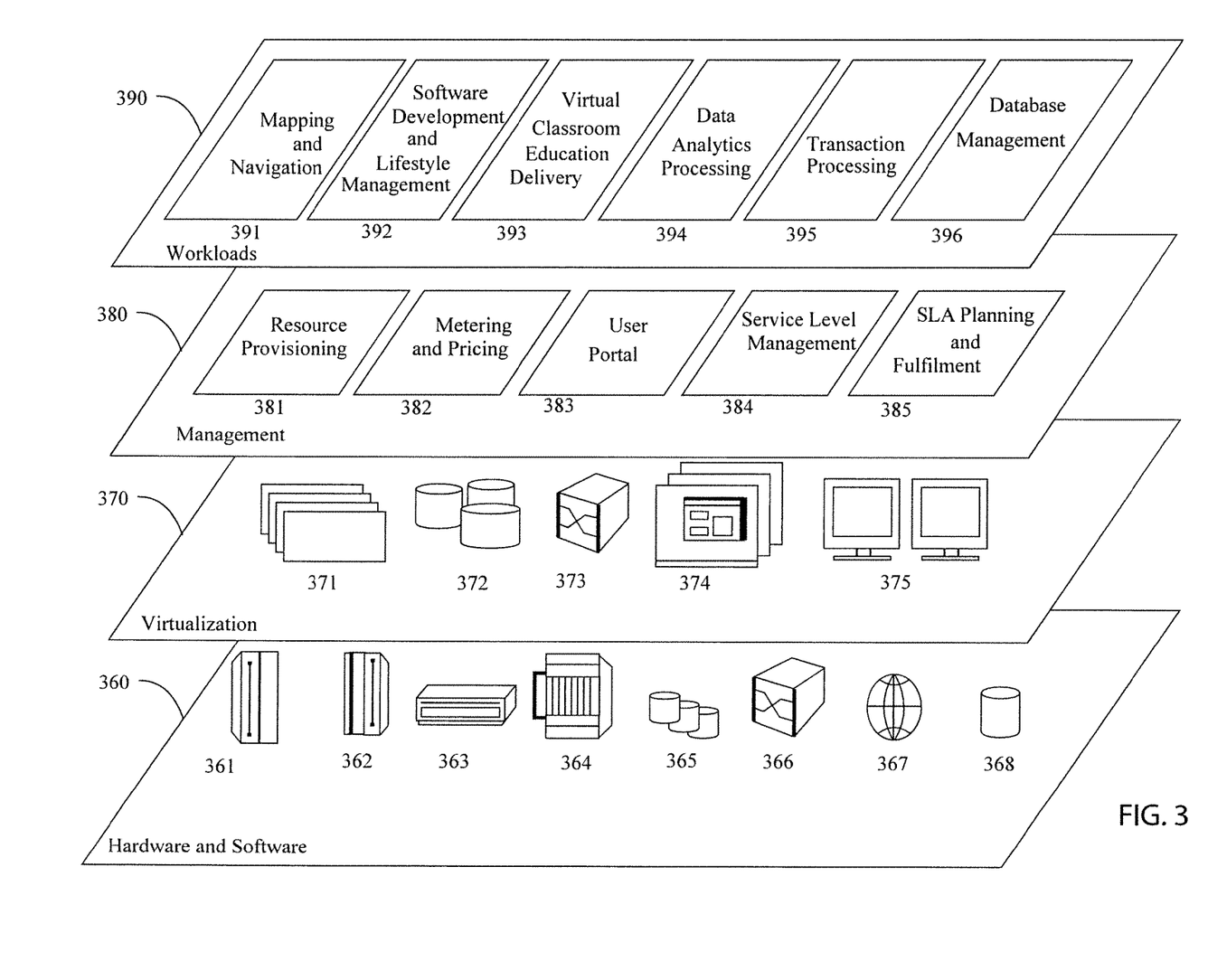
FIG. 3 is a block diagram showing a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and database management 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
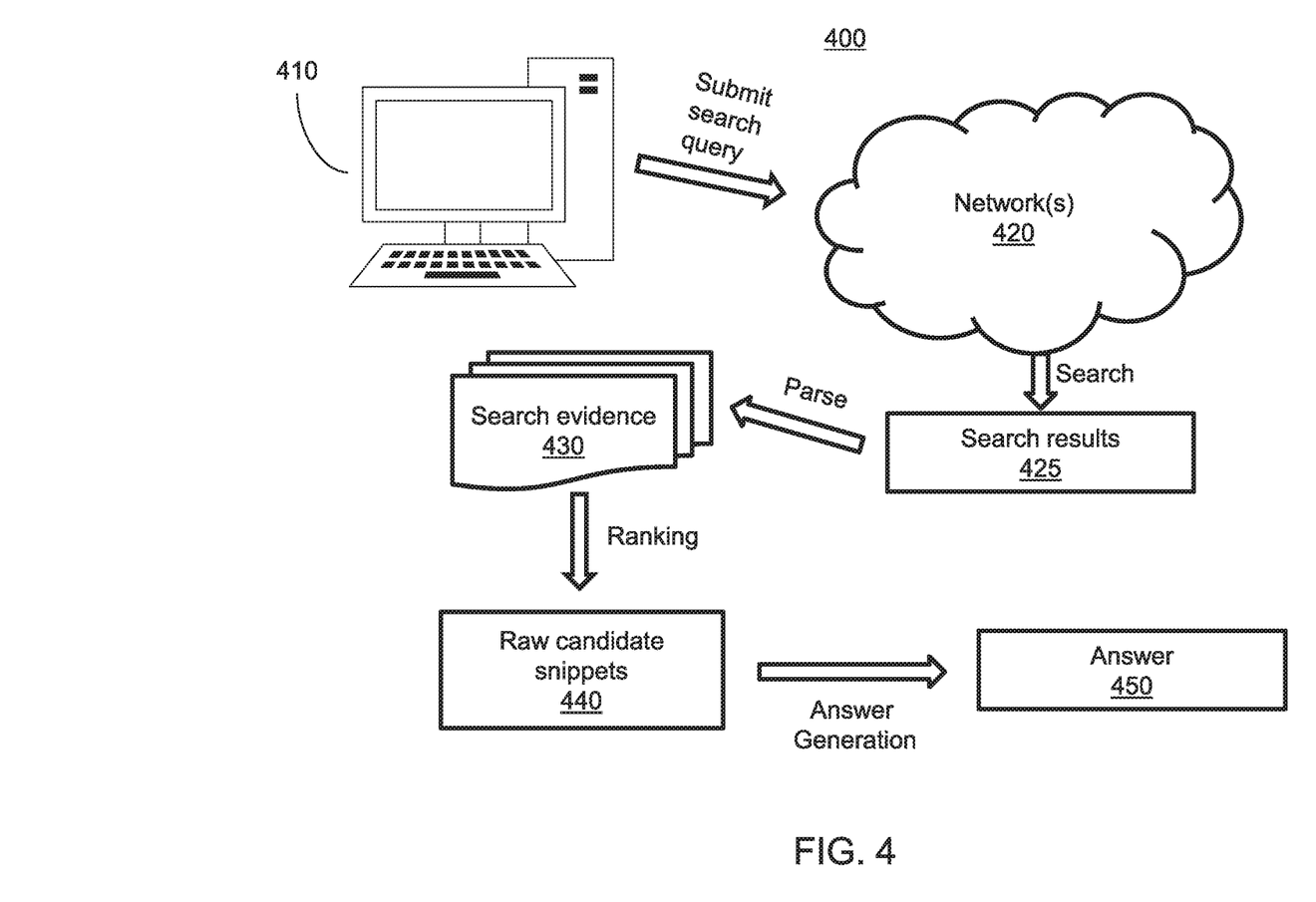
FIG. 4 is a block/flow diagram of an overview of a question-answering system/method, in accordance with an embodiment of the present invention.

With reference to FIG. 4, a block/flow diagram is provided illustrating an overview of a question-answering (QA) system 400.

As shown, a search query associated with a question is submitted as input from a computing device 410 to a search engine via one more networks 420. For example, the search query can be submitted by a user via a user interface (e.g., graphical user interface) provided on the computing device 410 and configured to interact with the QA system 400 across the network(s) 420. Although the computing device 410 is shown in FIG. 4 as a personal computer (PC), the computing device 410 can be any suitable computing device in accordance with the embodiments described herein. For example, the computing device 410 can alternatively be, e.g., a laptop, a mobile device (e.g., smartphone), or a PDA. The network(s) 420 can include, e.g., the Internet.

A search is performed by the search engine based on the search query submitted via the computing device 410 to obtain search results 425. Then, the search results 425 are parsed to generate search evidence 430. A given search result can include a plurality of components, including a title, a resource identifier, and a text snippet, and the search evidence 430 can include respective pairs, or tuples, of titles and text snippets of search results. For example, the resource identifier can include a Universal Resource Locator (URL) or web address specifying a location of the given search result on the network, and the text snippet can include a short description of the given search result (e.g., a preview of the given search result). The search evidence for the given search result can be provided as a tuple including the title and the text snippet corresponding to the given search result, and provides a source of external knowledge. The search evidence 430 can be ranked to provide a set of raw candidate text snippets 440, which can be used to generate an answer 450. Further details regarding the QA system 400 will be now described below with reference to FIG. 5.

Figure 5:
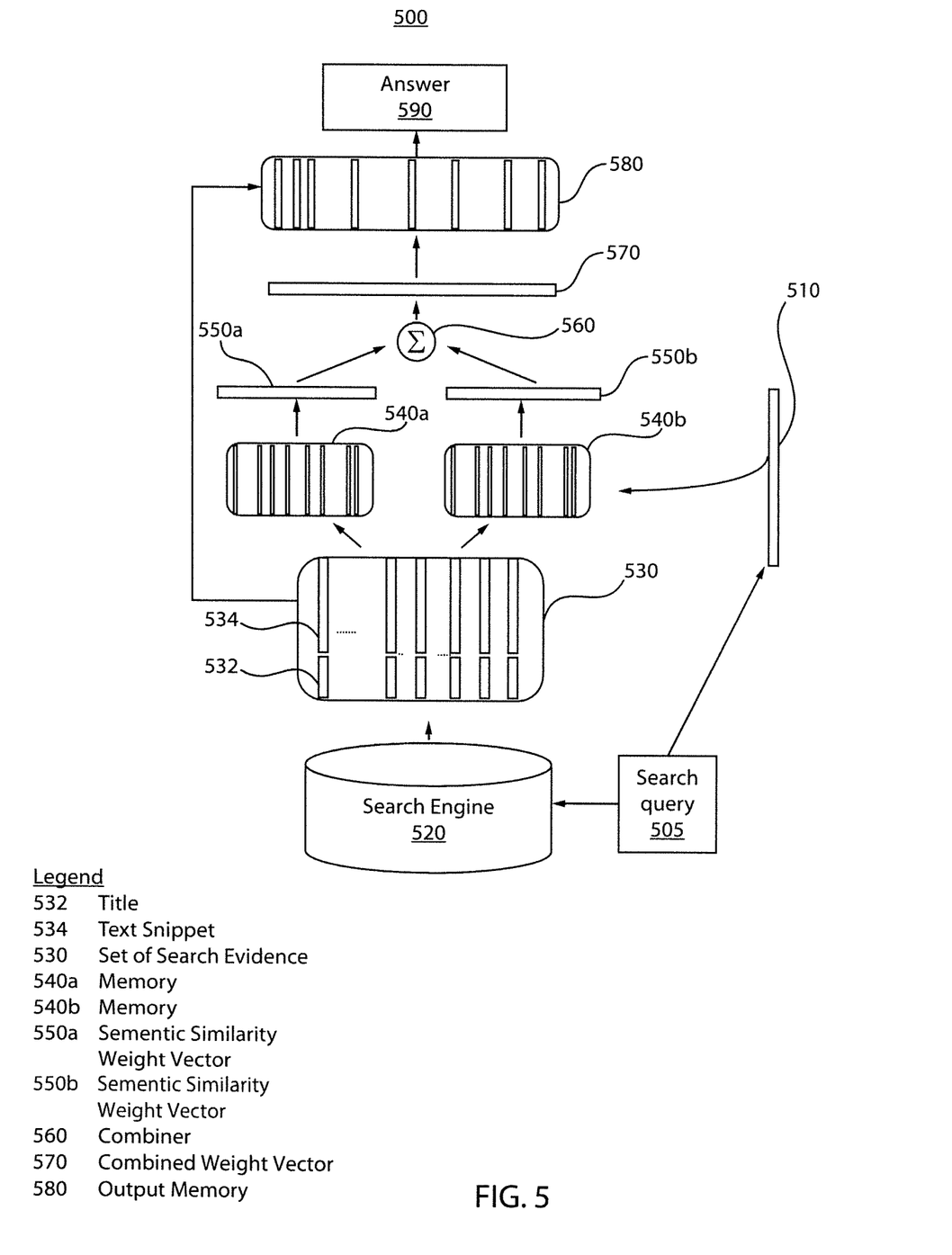
FIG. 5 is a block/flow diagram of a system/method of utilizing external knowledge and memory networks in a question-answering system, in accordance with an embodiment of the present invention.

With reference to FIG. 5, a block/flow diagram is provided illustrating an exemplary QA system 500.

As shown, a search query 505 corresponding to a question is provided as input into a search engine 520. An illustrative example of a search query is "Who is the wife of Obama?" The search query 505 can be pre-processed prior to being provided as input into the search engine 520. For example, tokenization or word segmentation can be performed on the search query 505, which can be necessary for languages such as, e.g., Chinese and Japanese. As another example, stop words can be removed from the search query 505. As yet another example, keyword extension can be performed to enrich the search query 505 (e.g., enriching the search query Who is the wife of Obama?" by replacing "Obama" with "Barack Obama" or "President Obama").

One or more search results returned by the search engine 520 are parsed to generate a set of search evidence 530. A given search result can include a plurality of components, including a title, a resource identifier, and a text snippet, and a set of search evidence 530 can include respective pairs, or tuples, of titles and text snippets of search results (e.g., title 532 and text snippet 534). For example, the resource identifier can include a Universal Resource Locator (URL) or web address specifying a location of the given search result on the network, and the text snippet 534 can include a short description of the given search result (e.g., a preview of the given search result). The search evidence for the given search result can be provided as a tuple including the title and the text snippet corresponding to the given search result, and provides a source of external knowledge.

The set of search evidence 530 can be generated in the form of a list or table. An illustrative example of a list or table of search evidence including titles and text snippets corresponding to search results of the search query "Who is the wife of Obama?" is provided with reference to Table 1:

TABLE 1

| Title | Text snippet |
|---|---|
| Michelle Obama - Wikipedia | Michelle LaVaughn Robinson Obama (born Jan. 17\, 1964) is an American lawyer\, university administrator), and writer who served as the First Lady of the United States from 2009 to 2017, She is married to the 44th U.S. President\, Barack Obama\, and was the first African-American First Lady.<br>Parents: Fraser Robinson III; Marian Shields Robinson<br>Political party: Democratic<br>Relatives: Craig Robinson (brother)<br>President: Barack Obama<br>Craig Robinson • Marian Shields Robinson • Sidley Austin • Let's Move! |
| Michelle Obama Biography - Biography | Explore the life of Michelle Obama, the 44th first lady and wife of President . . . who had previously run against Barack Obama during the 2008 primaries, and her . . . |
| . . . | . . . |

After the set of search evidence 530 is obtained, an encoder/decoder framework can be used to obtain an answer to the question associated with the search query 505 using the external knowledge derived from the set of search evidence 530.

More specifically, encoding can be performed based on the search query 505 to obtain a query vector 510 (e.g., a vector representation of the search query 505), and on the set of search evidence 530. The encoding can include title/snippet encoding and search query encoding. Regarding title/snippet encoding, the text snippets of the set of search evidence 530 can be encoded using snippet encoders to generate snippet vectors stored in snippet memory 540a, and the titles of the set of search evidence 530 can be encoded using title encoders to generate title vectors stored in title memory 540b. Although separate encoders are memory components are described with reference to FIG. 5, in other embodiments, a same encoder and/or memory component can be used to generate and store the snippet and title vectors. The title and snippet encoding can be performed using a neural network, such as, e.g., a recurrent neural network (RNN) or convolutional neural network (CNN), word embedding to convert each word into a word vector and summarize the word vectors, or any suitable technique in accordance with the embodiments described herein.

To compute weights, a semantic relatedness or similarity between the title and text snippet vectors and the query vector 510 can be computed to generate weights for obtaining the vector representation. The semantic relatedness can be represented as a function $f(q, v)$, where v represents a given vector in one of the memories 540a and 540b. The semantic relatedness can be implemented using a neural network and/or a similarity measure (e.g., cosine similarity). As shown, semantic similarity weight vectors 550a and 550b can be generated between the query vector and the snippet vectors and title vectors, respectively.

The weight vectors 550a and 550b can then be combined at block 560 to generate a combined weight vector 570. In one embodiment, the combination performed at block 560 can include adding and/or averaging weight vectors 550a and 550b. In another embodiment, the combination performed at block 560 can implement a neural network component.

An output memory 580 of the memory network can be obtained based on the combined weight vector 570. The output memory 580 can include memory vectors each obtained by encoding the title-snippet pair (e.g., a concatenation of the title and corresponding snippet) using a neural network component, such as, e.g., a recurrent neural network (RNN) or convolutional neural network (CNN), word embedding to convert each word into a word vector and summarize the word vectors, or any suitable technique in accordance with the embodiments described herein. A final vector representation can be obtained by multiplying the combined weight vector 570 and the memory vectors of the output memory 580. Accordingly, the final vector representation provides information about the search query and the search results.

A decoder can then be used to generate an answer 590 corresponding to the search query 505 by decoding the final vector representation. The answer 590 can be generated word-by-word. For example, given the final vector representation, the decoder can generate a first word, generate a second word based on the final vector representation and the first word, and repeat this process to generate the answer 590. Further details regarding the decoder will be described below with reference to FIG. 6.

Figure 6:
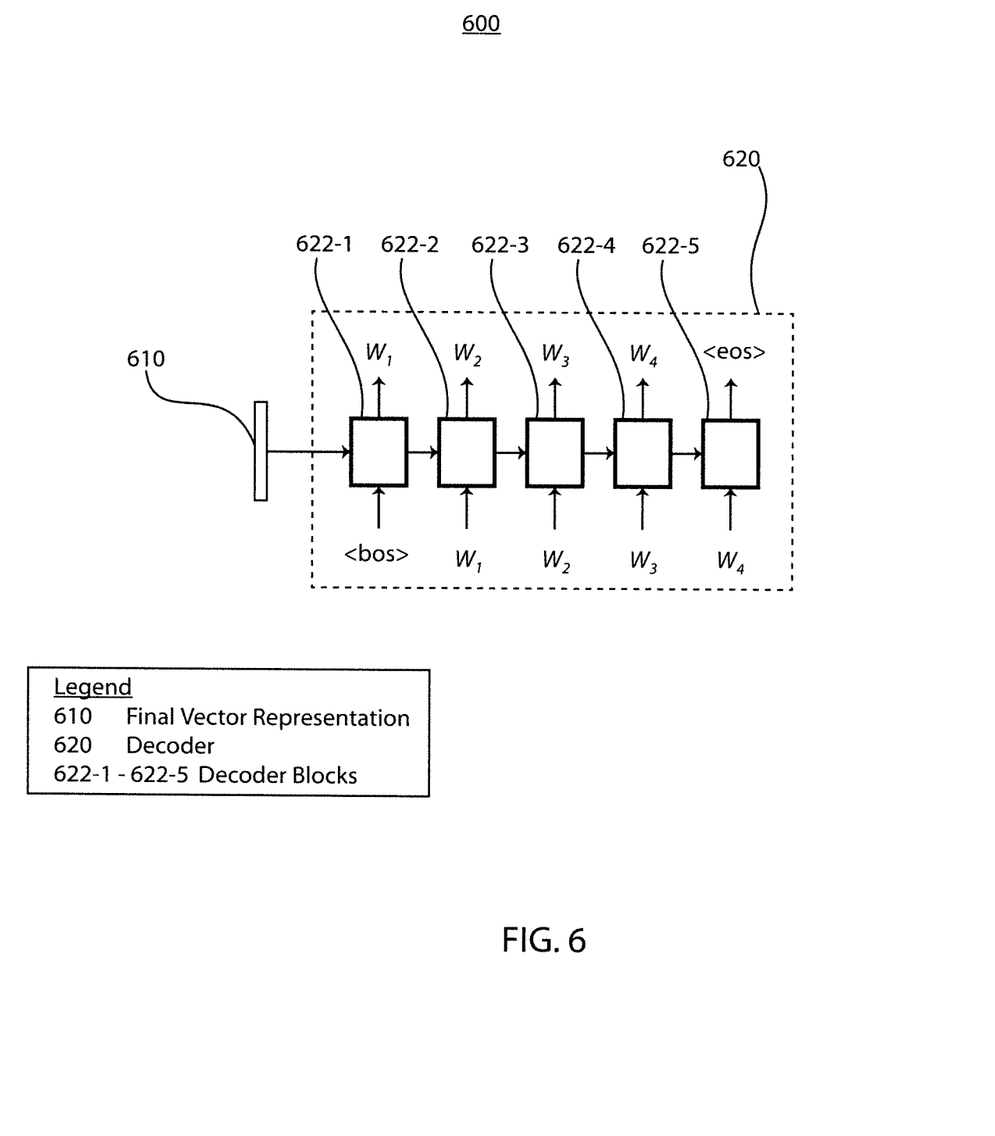
FIG. 6 is a block/flow diagram of a decoding process that can be implemented in the system/method of FIG. 5, in accordance with an embodiment of the present invention.

With reference to FIG. 6, a block/flow diagram is provided illustrating an exemplary decoder model for decoding a target sequence from the final vector representation. In one embodiment, the decoder model implements a long short-term memory (LSTM) architecture that extracts a sequence from an input vector.

As shown, a final vector representation 610 is provided as input into a decoder 620. The decoder 620 is configured to compute the representation of the final vector representation, and use the computed representation to compute a probability of an answer.

More specifically, the final vector representation 610 and a <bos> token signifying the beginning of sentence or sequence can be input into block 622-1 to obtain a prediction of a first word or token $W_1$. At block 622-2, a prediction of a first word or token $W_2$ can be generated. At block 622-3, a prediction of a third word or token $W_3$ can be generated. At block 622-4, a prediction of a fourth word or token $W_4$ can be generated. At block 622-5, an end of sentence token (<eos>) is reached and the decoding process terminates. Accordingly, an answer including four words or tokens $W_1$ through $W_4$ generated word-by-word is shown in this illustrative example.

Having described preferred embodiments of systems and methods for utilizing external knowledge and memory networks in a question-answering system (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A system for utilizing external knowledge and memory networks in a question-answering system, comprising:
    a memory device for storing program code; and
    at least one processor device operatively coupled to the memory device and configured to execute program code stored on the memory device to:
        receive, from a search engine of a question-answering system, one or more search results based on a search query associated with a question submitted via a user interface associated with a computing device;

analyze the one or more search results to generate search evidence as a source of external knowledge for generating an answer to the question, the search evidence including one or more titles and one or more corresponding text snippets;

perform an encoding, using a neural network, to encode the search evidence and the search query to generate a title vector, one or more snippet vectors, and a query vector stored in a memory network;

obtain a final vector representation based on the encoding; and decode the final vector representation to obtain the answer to the question.

2. The system of claim 1, wherein the at least one processor device is further configured to execute program code stored on the memory device to pre-process the search query prior to the search query being provided as input to the search engine.

3. The system of claim 1, wherein the at least one processor device is further configured to execute program code stored on the memory device to:

compute a semantic relatedness or similarity between the title and snippet vectors and the encoded search query to generate respective weight vectors for obtaining the final vector representation; and combine the weight vectors to generate a combined weight vector.

4. The system of claim 1, wherein the at least one processor device is further configured to execute program code stored on the memory device to obtain an output memory including memory vectors based on a combined weight vector, wherein the final vector representation is obtained by multiplying the combined weight vector and the memory vectors.

5. The system of claim 1, wherein the at one processor device is configured to generate the answer word-by-word.

6. A computer-implemented method for utilizing external knowledge and memory networks for in a question-answering system, comprising:

receiving, from a search engine of a question-answering system, one or more search results based on a search query associated with a question submitted via a user interface associated with a computing device;

analyzing the one or more search results to generate search evidence as a source of external knowledge for generating an answer to the question, the search evidence including one or more titles and one or more corresponding text snippets;

encoding, using a neural network, the search evidence and the search query to generate a title vector, one or more snippet vectors, and a query vector stored in a memory network;

obtaining a final vector representation based on the encoding; and decoding the final vector representation to obtain the answer to the question.

7. The method of claim 6, further comprising pre-processing the search query prior to the search query being provided as input to the search engine.

8. The method of claim 6, further comprising:

computing a semantic relatedness or similarity between the title and snippet vectors and the encoded search query to generate respective weight vectors for obtaining the final vector representation; and combining the weight vectors to generate a combined weight vector.

9. The method of claim 6, further comprising obtaining an output memory including memory vectors based on a combined weight vector, and wherein the final representation is obtained by multiplying the combined weight vector and the memory vectors of the output memory.

10. The method of claim 6, wherein the answer is generated word-by-word.

11. A computer program product comprising a non-transitory computer readable storage medium having program instructions embodied therewith, the program instructions executable by a computer to cause the computer to perform a method for utilizing external knowledge and memory networks in a question-answering system, the method performed by the computer comprising:

receiving, from a search engine of a question-answering system, one or more search results based on a search query associated with a question submitted via a user interface associated with a computing device;

analyzing the one or more search results to generate search evidence as a source of external knowledge for generating an answer to the question, the search evidence including one or more titles and one or more corresponding text snippets;

encoding, using a neural network, the search evidence and the search query to generate a title vector, one or more snippet vectors, and a query vector stored in a memory network;

obtaining a final vector representation based on the encoding; and decoding the final vector representation to obtain the answer to the question.

12. The computer program product of claim 11, further comprising pre-processing the search query prior to the search query being provided as input to the search engine.

13. The computer program product of claim 11, further comprising:

computing a semantic relatedness or similarity between the title and snippet vectors and the encoded search query to generate respective weight vectors for obtaining the final vector representation; and combining the weight vectors to generate a combined weight vector.

14. The computer program product of claim 11, further comprising obtaining an output memory including memory vectors based on the combined weight vector, wherein the final vector representation is obtained by multiplying a combined weight vector and the memory vectors of the output memory.

15. The computer program product of claim 11, wherein the answer is generated word-by-word.

* * * * *